United States Patent [19]

Sato et al.

[11] Patent Number: 4,757,462
[45] Date of Patent: Jul. 12, 1988

[54] SIGNAL PROCESSING APPARATUS

[75] Inventors: Kei Sato, Yokohama; Noboru Murayama, Tokyo, both of Japan

[73] Assignee: Ricoh Company, Ltd., Tokyo, Japan

[21] Appl. No.: 95,520

[22] Filed: Sep. 11, 1987

Related U.S. Application Data

[63] Continuation of Ser. No. 676,399, Nov. 29, 1984, abandoned.

[30] Foreign Application Priority Data

Dec. 8, 1983 [JP] Japan ................................. 58-232170

[51] Int. Cl.⁴ ............................................. G06F 15/04
[52] U.S. Cl. .................................... 364/519; 340/731; 400/121; 400/303; 400/306
[58] Field of Search ................ 364/519, 521; 340/731, 340/749, 734, 721, 728; 400/303, 304, 305, 306, 121; 346/108

[56] References Cited

U.S. PATENT DOCUMENTS

| | | | |
|---|---|---|---|
| 3,999,168 | 12/1976 | Findley et al. | 340/731 |
| 4,050,563 | 9/1977 | Menhennett | 340/731 |
| 4,090,188 | 5/1978 | Sugg | 340/731 |
| 4,107,786 | 8/1978 | Masaki et al. | 340/731 |
| 4,152,981 | 5/1979 | Sapino et al. | 400/305 |
| 4,159,882 | 7/1979 | Sanders, Jr. et al. | 400/124 |
| 4,254,409 | 3/1981 | Busby | 340/731 |
| 4,321,599 | 3/1982 | Yoshiba | 400/306 |
| 4,326,813 | 4/1982 | Lomicka, Jr. et al. | 400/306 |
| 4,342,096 | 4/1982 | McDevitt | 340/371 |
| 4,451,899 | 5/1984 | Yamazaki | 340/371 |
| 4,554,637 | 11/1985 | Kuntze | 364/519 |
| 4,584,573 | 4/1986 | Ito | 340/745 |
| 4,625,219 | 11/1986 | Horiuchi | 346/108 |

FOREIGN PATENT DOCUMENTS

| | | | |
|---|---|---|---|
| 58-117036 | 4/1983 | Japan | 364/519 |
| 59-223840 | 12/1984 | Japan | 364/519 |

Primary Examiner—Parshotam S. Lall
Assistant Examiner—Daniel W. Juffernbruch
Attorney, Agent, or Firm—Mason, Fenwick & Lawrence

[57] ABSTRACT

A pattern pitch adjustment is applied to dot matrix pattern data as it is output from a CPU to a printer. The data is transferred from a DMA to the printer bit by bit, and the number of synchronizing signals output from the printer for each bit is counted to decide picture element timing. During a given period of time after transferring each data pattern, a waiting signal is applied to the DMA so that space picture element data is fed to the printer.

7 Claims, 4 Drawing Sheets

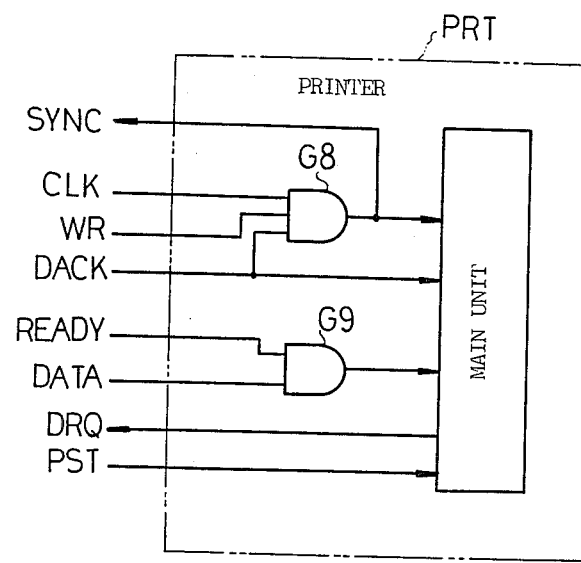

SIGNAL PROCESSING APPARATUS

This application is a continuation of application Ser. No. 676,399, filed Nov. 29, 1984, now abandoned.

FIELD OF THE INVENTION

The present invention relates to data processing of a dot matrix system in which a number of minute picture elements are arranged in the form of a matrix and density of each picture element being set in accordance with a pattern to represent a character or the like, and more particularly to adjustment of pattern pitch.

DESCRIPTION OF THE PRIOR ART

When printing visible a character pattern by making use of a printer, for example, there is often a need of adjusting the pitch between the every adjacent patterns in accordance with type of documents to be output, or for other reasons. For alphabets, the pattern pitch is typically divided into an elite pitch (1/12 inch) and a pica pitch (1/10 inch).

In general, when representing a character pattern composed of a dot matrix, the size (i.e., dot configuration) of each character pattern is fixed previously. Microcomputers are adapted to handle data in units of 8-bits in many cases, so the dot configuration is usually set to be a multiple of 8 (this unit is referred to as a byte). Assuming that a given character pattern has the dot configuration of 24×24, for example, the 8-bit processing apparatus is able to process picture element data of 8-bits at a time with one dot corresponding to 1 bit of data, whereby data on one line (24 dots) of each pattern can be transferred by repeating 8-bit processing three times.

In the case of apparatus which is adapted to process data in bytes, however, a space (i.e., blank dot region) is produced at intervals of 8 dots. This space is inserted between adjacent patterns for adjusting pattern pitch. As a result, pitch adjustment is allowed for each width of ⅓ pattern with the dot configuration of 24×24, for example.

To carry out fine pitch adjustment, transfer of data may be processed in bits. But this requires processing steps 8 times as much as processing in bytes, so that it takes a longer time correspondingly.

SUMMARY OF THE INVENTION

It is an object of the present invention to permit adjustment of fine pattern pitch without increasing the processing time of data processing apparatus.

To make the processing time of the data processing apparatus shorter, data is processed in parallel for all plural bits and, to allow fine adjustment of pattern pitch, data is processed in bits.

According to the present invention, therefore, data is processed in bytes in the main processing apparatus, but processed in bits when the data is issued to a printer or other output units. More specifically, byte-by-byte data issued from the main processing apparatus is once loaded in a memory, and the stored data is then transferred on a bit-by-bit basis to the output unit such as a printer. At the time of transferring data from the memory to the printer, etc., a counter or the like is used to count the number of bits or dots of the transferred data and, in synchronous relation with the counted result, arbitrary space (blank) data is inserted between the adjacent patterns as required.

By so doing, the pattern pitch can be set to any desired one on a dot-by-dot basis.

BRIEF DESCRIPTION OF THE DRAWINGS

FIG. 2 is a block diagram showing a printer PRT in FIG. 1.

DESCRIPTION OF THE PREFERRED EMBODIMENT

In the following, a preferred embodiment of the present invention will be described with reference to the drawings.

Figure 1:
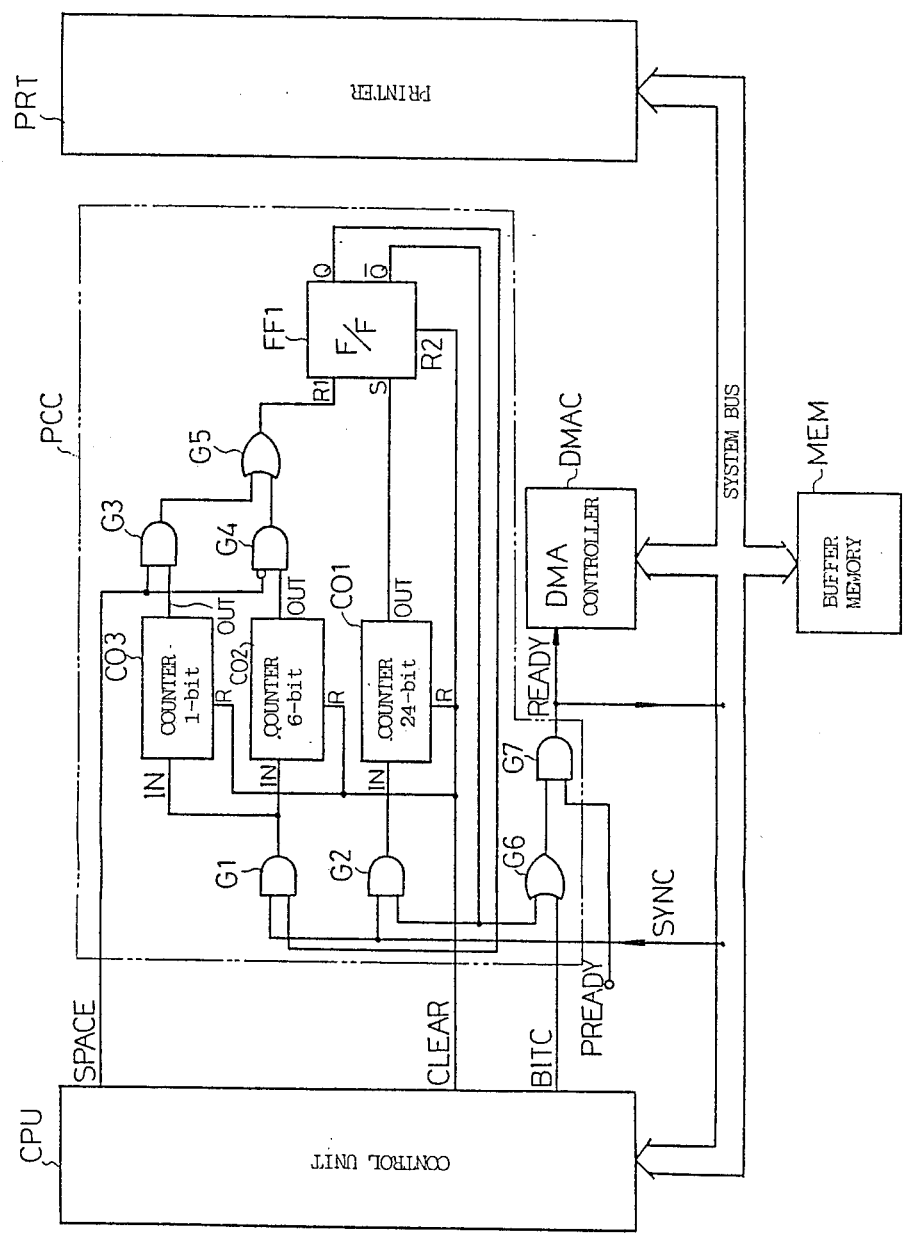
FIG. 1 is a block diagram showing the structure of a signal processing apparatus of one type embodying the present invention.

FIG. 1 shows an outline of a signal processing apparatus of one type embodying the present invention. Referring to FIG. 1, a control unit (microcomputer) CPU, buffer memory MEM, printer PRT, DMA (direct memory access) controller DMAC, and a pattern pitch control circuit PCC are connected to a system bus. The control unit CPU carries out parallel processing in units of 8-bits and loads given pattern data into the buffer memory MEM.

Figure 3A:
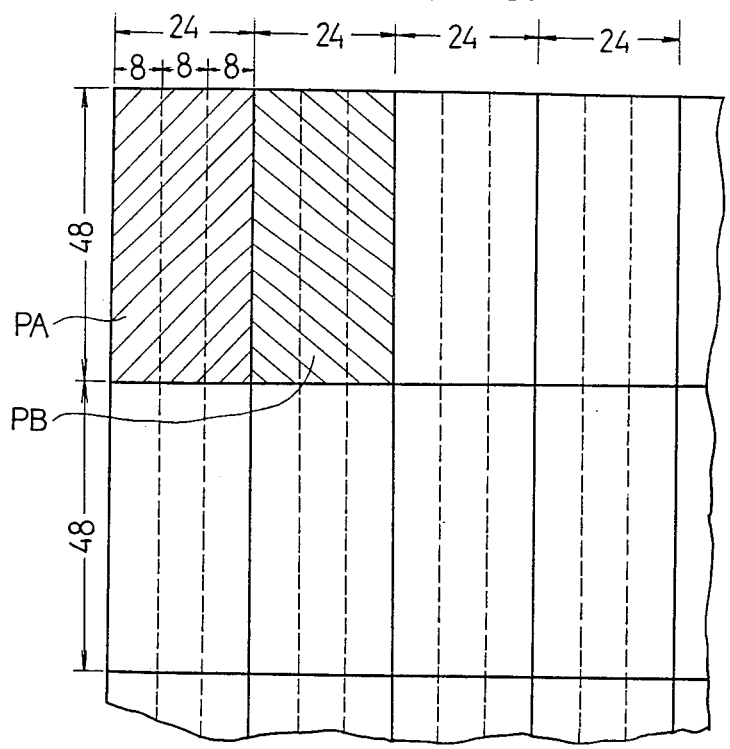
FIG. 3a is a plan view showing the arrayed state of data in the buffer memory MEM of FIG. 1.

A data array in the buffer memory is as shown in FIG. 3a. More specifically, one pattern in this example is composed of a matrix of 24×48 dots, and each of the pattern data (PA, PB . . . ), having been processed in units of 8-bits is allocated to continuous addresses for every 24-bits.

The DMA controller DMAC functions to carry out data transfer processing at high speed. When the DMAC comes into operation, the microcomputer (CPU) is disconnected from the system bus and various control signals are produced and then output to the system bus instead. In this example, the DMAC reads data out of the buffer memory MEM on a bit-by-bit basis, and outputs the read data to the printer PRT.

The system bus includes, in this embodiment, signal lines for passing therethrough address information (16-bit), data information (8-bit), clock pulses CLK, a writing strobe signal WR, a reading strobe signal RD, a direct memory access request signal DRQ, a direct memory access acknowledge signal DACK, a ready signal READY, a print start instruction signal PST, a hold request signal HRQ, a hold acknowledge signal HLDA, and a printer reception synchronizing signal SYNC.

The ready signal READY is produced by the pattern pitch control circuit PCC based on the printer reception synchronizing signal SYNC. Three control lines are connected from the control unit CPU to the pattern pitch control circuit PCC. More specifically, a signal line BITC is used to control whether or not blank data in bits is to be inserted between one pattern and the next pattern (H: insertion disabling, L: insertion). A signal line CLEAR is used to clear the pattern pitch control circuit PCC. A signal line SPACE is used to set the dot number (width) of the blank space to be inserted between the individual patterns (H: 1 dot, L: 6 dots), when the signal line BITC assumes L.

The pattern pitch control circuit PCC is composed of a 24-bit counter CO1, 6-bit counter CO2, 1-bit counter CO3, flip-flop FF1, and various logical gates G1, G2, G3, G4, G5, G6 and G7. An output terminal OUT of each counter CO1, CO2 or CO3 is normally L immediately after it has been cleared, but assumes H when pulses corresponding to the predetermined number of bits are applied to an input terminal IN thereof. The flip-flop FF1 includes one set input terminal S, two reset input terminals R1, R2, and two output terminals Q, $\overline{Q}$. The output terminal Q issues a signal of L in a reset state, but a signal of H when it is set. The output terminal $\overline{Q}$ issues a signal complementary to that from the Q.

FIG. 2 shows an interface section of the printer PRT. Referring now to FIG. 2, the printer PRT includes signal lines for the printer reception synchronizing signal SYNC, clock pulses CLK, writing strobe signal WR, direct memory access acknowledge signal DACK, ready signal READY, data line DATA, direct memory access request signal DRQ, print start instruction signal PST, etc. The printer PRT also includes two AND gates G8 and G9. In this embodiment, the printer reception synchronizing signal SYNC is produced in the form of the logical sum of the CLK, WR and signals. Picture element data is applied to the main printer unit in the form of the logical sum of the data DATA and the ready signal READY on the system bus.

Figure 3B:
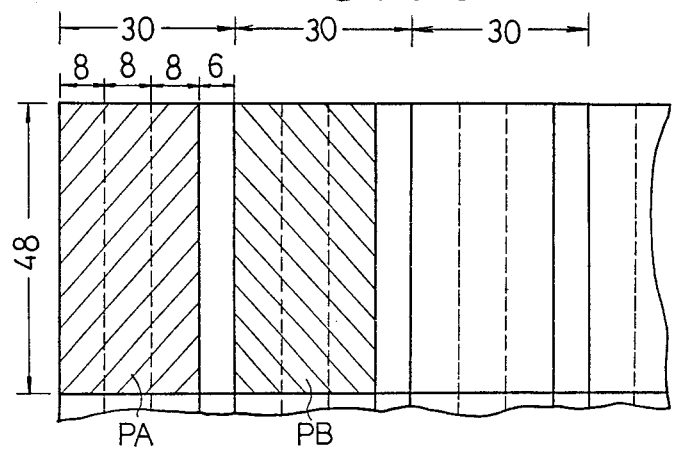
FIG. 3b is a plan view showing an array of data to be sent to the printer PRT.
Figure 4:
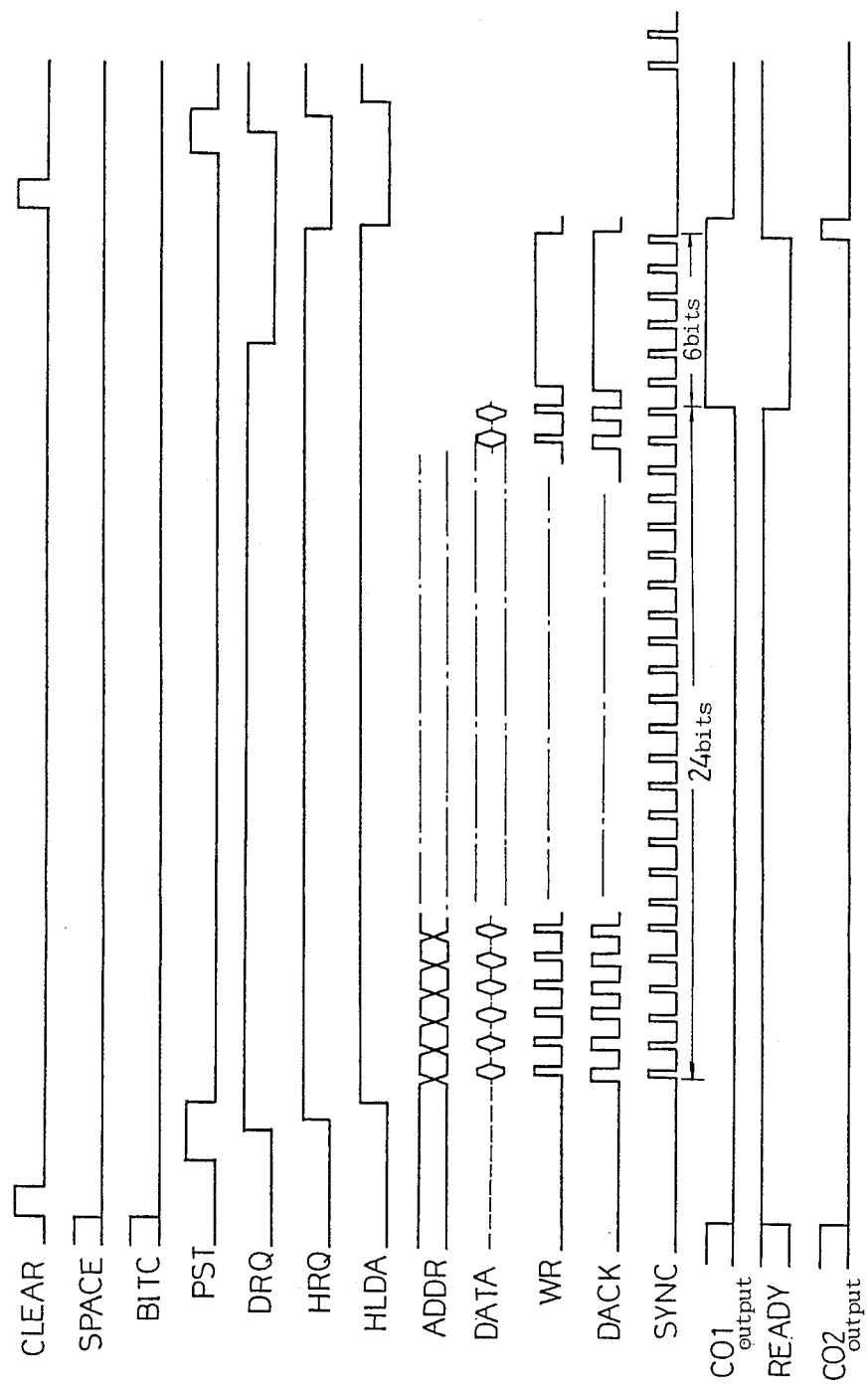
FIG. 4 is a timing chart showing one example of signal timing for the apparatus shown in FIG. 1.

FIG. 4 schematically shows signal timings of the apparatus shown in FIG. 1. Description will now be made with reference to FIG. 4. It is presumed that the control unit CPU has carried out given processings in advance, thus causing the buffer memory MEM to load therein pattern data as shown in FIG. 3a. When an instruction to record the produced pattern data is applied externally, the control unit CPU first controls the signal lines SPACE, CLEAR and BITC. This embodiment is assumed such that both the BITC and SPACE are set to L, thus causing a blank corresponding to 6 dots to be inserted between every two patterns as shown in FIG. 3b.

Next, when the control unit CPU applies the printer start instruction signal (H) to the printer PRT, the printer PRT in turn applies the direct memory access request signal DRQ (H) to the DMA controller DMAC. Upon receiving the signal DRQ, the DMAC applies the hold request signal HRQ (H) to the control unit CPU. Upon receiving the signal HRQ, the control unit CPU opens the system bus and then outputs the hold acknowledge signal HLDA.

Upon receiving the signal HLDA, the DMA controller DMAC sets predetermined 16-bit address information on the address bus, and applies a memory reading strobe signal RD (not shown) to the buffer memory MEM. This causes the buffer memory MEM to read data at the given addresses (picture element data at the upper left end in FIG. 3a for the first time: addresses for the picture element data to be read are sequentially shifted rightwardly and, after reading all the data on one line, they proceed to the next line), and then to output the read data onto the data line of the system bus one bit at a time.

At substantially the same time, the DMA controller DMAC outputs the data writing strobe signal WR to the printer PRT, so that the printer PRT inputs the data on the data line. In an initial state, since the counters CO1, CO2 and CO3 and the flip-flop FF1 are cleared, the ready signal READY assumes H. If the ready singal READY remains at H, the DMA controller DMAC transfers the data in a minimum time without waiting.

The printer PRT outputs the clock pulses CLK as the reception synchronizing signal SYNC during the time when the writing strobe signal WR (H) and the direct memory access acknowledge signal DACK (H) are both applied thereto. If the ready signal READY remains at H, the amount of picture element data read out of the buffer memory MEM corresponds to the number of pulses of the synchronizing signal SYNC in the ratio of one to one.

The DMA controller DMAC updates the addresses and repeats the foregoing operation in sequence until data transfer of given picture elements is completed. Just after starting the operation, since the flip-flop FF1 is cleared, the output terminal Q assumes L and the $\overline{Q}$ assumes H. Therefore, the gate G1 is closed and the gate G2 is opened. This causes the printer reception synchronizing signal SYNC to be applied to the input terminal of the counter CO1 through the gate G2.

After completion of data transfer for 24 picture elements, i.e., after 24 synchronizing signals SYNC have been output from the printer PRT, the output terminal of the counter CO1 is inverted to H. This causes the flip-flop FF1 is to be set so that the output terminals Q and $\overline{Q}$ are inverted to H and L, respectively, the gate G1 is opened and the gate G2 is closed. Furthermore, when the output terminal $\overline{Q}$ of the flip-flop FF1 is inverted to L, the ready signal READY appearing at the output terminal of the gate G7 turns to L.

When the ready signal READY turns to L, the DMA controller DMAC maintains such a state that the direct memory access acknowledge signal DACK (H) and the writing strobe signal WR (H) are both being output. In this state, one picture element data at 24-th dot is just read out continuously in fact, but since the signals DACK and WR are both being output for a longer time, a plurality of clock pulses CLK are output as the reception synchronous pulses SYNC during such a prolonged period. At this time, since the ready signal READY assumes L, the output terminal of the logical gate G9 assumes L (blank level) irrespective of the state on the data line DATA, so that the printer PRT receives the data indicating blank picture elements in the same number as the synchronizing pulses SYNC.

In the above state with the gate G1 being opened, the counters CO2 and CO3 both count the synchronizing pulses SYNC through the gate G1. The counter CO3 sets its output terminal to H when it has counted one synchronizing pulse, while the counter CO2 sets its output terminal to H when it has counted six synchronizing pulses. Because the signal SPACE is set to L in this example, an output signal of the counter CO3 imposes no influence upon the flip-flop FF1.

When the 6 pulses of the synchronizing signal SYNC are output after turning of the ready signal READY to L, the output terminal of the counter CO2 becomes H to thereby reset the flip-flop FF1 through the gates G4 and G5. Upon resetting of the flip-flop FF1, the output terminals Q and $\overline{Q}$ thereof are cleared to L and H, respectively, thereby returning the ready signal READY to H. When the ready signal READY turns to H, the DMA controller DMA decides that data transfer of the preset 24 picture elements has been completed, and then releases holding of the control unit CPU. If other data to be transferred remains, the control unit CPU once again outputs the print start signal PST to the printer PRT. In this manner, processing similar to the above will be repeated until all the data is completely transferred.

In other words, while the individual patterns including no blank therebetween, i.e., pattern data of 24-dot pitch, are continuously loaded in the buffer memory MEM as shown in FIG. 3a, the data applied to the printer PRT has a 30-dot pitch such that it includes the blank picture element data of 6 dots subsequent to the pattern data of 24 dots on each line.

In the above example, the pattern pitch became a 30-dot pitch on the assumption that the signal BITC and the signal SPACE are both set to L. As an alternative, it may be a 25-dot pitch with the BITC and SPACE being set to L and H, respectively, a 24-dot pitch with the BITC being set to H and no blank dot being inserted, or a 32-dot pitch in case that a blank pattern (8-dot width) is previously inserted in the data stored in the buffer memory MEM. Assuming now that dot density of the printer is equal to 300 dots/inch, the recording pitch can be set to any desirous value of 1/10, 1/12, 1/12.5 and 1/9.735 (inch) in the above example. The control unit can process the picture element data in units of or one byte, thus causing the processing to take a shorter period of time.

Although the foregoing embodiment was so arranged that two counters CO2 and CO3 were used to change the pattern pitch by selecting either one of those counters, more counters may be used to permit selection of any desired pattern pitch. As an alternative, one preset counter may be employed to set the desired pattern pitch using the data set by the CPU. Furthermore, although the foregoing embodiment was described with reference to the case that pattern data was output to a printer, the present invention can be similarly practiced to an application in which character pattern data is transferred to other display units such as a CRT, for example.

According to the present invention, as fully described in above, there can be produced visible blank data to be inserted between every two adjacent visible dot patterns resulting in fine pattern pitch adjustment.

What is claimed is:

1. A dot matrix printer controller with adjustable pitch, said controller comprising:
    data processing means for processing data consisting of words made up of a plurality of bits;
    memory means for storing said digital words;
    output means for producing visible characters in eye-readable form, each character produced in accordance with a given pattern made up of a plurality of dots constituting a dot matrix, said output means providing a synchronizing signal for each bit used by said output means for producing said visible characters;
    transfer control means including first counting means for counting the number of said synchronizing signals from said output means for detecting the width of the dot matrix pattern of a visible character, second counting means for counting the number of said synchronizing signals from said output means, said first and second counting means each being set to count to a preset value, and selection means selecting the amount of space between adjacent characters from said preset values for setting the pitch of said visible characters by causing said output means to space adjacent characters a predetermined distance from each other; and
    transfer means for transferring data from said memory means to said output means in a bit stream, including DMA means for directly accessing said memory means, said DMA means carrying out time-waiting control of said transfer means at predetermined time intervals in accordance with the counted numbers and the preset values derived from the transfer control means.

2. The controller according to claim 1, wherein said transfer control means inhibits counting of said second counting means (a) until the counted number of said first counting means reaches said preset value thereof; (b) inhibits counting of said first counting means, allows counting of said second counting means, sets said transfer means in a waiting state and applies information of a blank picture element to a data input line of said output means, when the counted number of said first counting means reaches said preset value thereof; and (c) inhibits counting of said second counting means and allows counting of said first counting means, when the counted value of said second counting means reaches said preset value thereof.

3. The controller according to claim 1, wherein said transfer control means includes a flip-flop having its state set by an output from one of said first and second counting means and reset by an output from the other of said first and second counting means, and wherein said second counting means includes logic gate means for selectively connecting a plurality of additional counters having preset values different from one another to said flip-flop.

4. The controller according to claim 1, wherein said output means produces the synchronizing signal based on at least a writing strobe signal output from said transfer means, and a clock pulse signal of constant period.

5. The controller according to claim 1, wherein said output means produces the synchronizing signal based on at least a transfer acknowledge signal output from said transfer means and a clock pulse signal of constant period.

6. A dot matrix controller comprising:
    data processing means including a given memory for processing data in words, where each word is made up of a plurality of bits;
    output means for producing visible character patterns in accordance with given pattern information in the form of a dot matrix, and for outputting a synchronizing signal for each bit of said pattern information;
    transfer means for transferring data in the memory of said data processing means to said output means; and
    transfer control means including first counting means for counting the number of said synchronizing signals from said output means to detect the width of a dot matrix pattern, and second counting means for counting the number of said synchronizing signals from said output means to set a preset pitch for the dot matrix patterns, said first and second counting means each set to count to a preset value, said transfer control means (a) inhibits counting of said second counting means until the counted number of said first counting means reaches the preset value thereof; (b) inhibits counting of said first counting means, allows counting of said second counting means, sets said transfer means in a waiting state and applies information of a blank picture element to a data input line of said output means, when the counted number of said first counting means reaches the preset value thereof; and (c) inhibits counting of said second counting means and allows counting of said first counting means, when the counted value of said second counting means reaches the preset value thereof.

7. A dot matrix controller comprising:

data processing means including a given memory for processing data in words, where each word is made up of a plurality of bits;

output means for producing visible character patterns in accordance with given pattern information in the form of a dot matrix, and for outputting a synchronizing signal for each bit of said pattern information;

transfer means for transferring data in the memory of said data processing means to said output means; and transfer control means including first counting means for counting the number of said synchronizing signals from said output means to detect the width of a dot matrix pattern, and second counting means for counting the number of said synchronizing signals from said output means to set a preset pitch for the dot matrix patterns, said transfer control means includes a flip-flop having its state set by an output from one of said first and second counting means and reset by an output from the other of said first and second counting means, and wherein said second counting means includes logic gate means for selectively connecting a plurality of additional counters having preset values different from one another to said flip-flop.

* * * * *